(12) United States Patent
Jaeger et al.

(10) Patent No.: US 7,439,471 B2
(45) Date of Patent: Oct. 21, 2008

(54) APPARATUS AND METHOD FOR AUTOMATED SERVICING OF A WELDING TORCH

(75) Inventors: Thomas Jaeger, Stoney Point (CA); Robert Lajoie, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/088,628

(22) Filed: Mar. 24, 2005

(65) Prior Publication Data

US 2005/0211684 A1    Sep. 29, 2005

Related U.S. Application Data

(60) Provisional application No. 60/556,129, filed on Mar. 25, 2004.

(51) Int. Cl.
    *B23K 9/00* (2006.01)
    *B23K 9/32* (2006.01)
(52) U.S. Cl. .................. 219/125.1; 219/136
(58) Field of Classification Search .......... 219/125.1, 219/78.14, 78.15, 136, 137, 43
    See application file for complete search history.

(56) References Cited

U.S. PATENT DOCUMENTS

| | | | |
|---|---|---|---|
| 4,583,257 A | | 4/1986 | Bridges et al. |
| 4,645,901 A | * | 2/1987 | Scholz et al. ............ 219/125.1 |
| 4,702,195 A | | 10/1987 | Thielmann |
| 4,733,050 A | * | 3/1988 | Grafius .................... 219/125.1 |
| 4,834,280 A | | 5/1989 | Thielmann |
| 4,883,939 A | | 11/1989 | Sagi |
| 5,845,357 A | * | 12/1998 | Anderson ................... 15/93.1 |
| 6,399,917 B1 | | 6/2002 | Simond |

FOREIGN PATENT DOCUMENTS

| | | |
|---|---|---|
| CA | 2037487 | 9/1991 |
| CA | 2217248 | 5/1998 |
| CA | 2429974 | 11/2001 |
| DE | 3735598 | 5/1989 |
| JP | 60102282 | 6/1985 |
| JP | 62197275 | 8/1987 |
| JP | 5077044 | 3/1993 |
| JP | 6269946 | 9/1994 |
| JP | 7284945 | 10/1995 |
| JP | 11-347731 | 12/1999 |
| JP | 2001-105134 | 4/2001 |
| WO | WO 2004/103832 A1 | 12/2004 |

OTHER PUBLICATIONS

International Search Report for PCT Application No. PCT/IB2005/000783 mailed on Aug. 16, 2005.

* cited by examiner

*Primary Examiner*—Kevin P Kerns
(74) *Attorney, Agent, or Firm*—Fletcher Yoder (57) ABSTRACT

An apparatus and method are providing for automated servicing of MIG welding torches and components thereof including the nozzle, the retaining head assembly, and the contact tip. The invention is directed to removing and cleaning a nozzle from a first end proximal to the torch, cleaning a retaining head assembly of deposited welding wire, or removing a used contact tip to be replaced with a replacement contact tip obtained from a magazine or combinations thereof. The invention can feature severing a welding wire or applying an anti-spatter solution to the torch or its components. The invention is also directed a plurality of maintenance operations being performed as to a stationary torch in an automated environment.

9 Claims, 8 Drawing Sheets

APPARATUS AND METHOD FOR AUTOMATED SERVICING OF A WELDING TORCH

CROSS-REFERENCE TO RELATED APPLICATIONS

This application claims priority to and the benefit of United States Provisional Patent Application Ser. No. 60/556,129, filed on Mar. 25, 2004, the disclosure of which is incorporated herein by reference.

TECHNICAL FIELD

The invention relates generally to Gas Metal Arc Welding, and more particularly to servicing torch systems utilized in Gas Metal Arc Welding applications.

BACKGROUND

Generally, Gas Metal Arc Welding applications include Metal Inert Gas ("MIG") torch systems for welding. The torch system generally consists of a handle, a gooseneck, a retaining head assembly, a contact tip, and a nozzle. The torch system can be connected to a robotic welding arm via a mount. A welding wire is fed from a wire supply through the torch system, and ultimately through a passageway in the contact tip. The wire exits the torch via the nozzle, which can be disposed at an end of the welding torch. The welding wire, when energized for welding, carries a high electrical potential. When the welding wire makes contact with the target metal, often called a workpiece, an electrical circuit is completed and current flows through the welding wire, across the metal workpiece and back to a power supply. The current causes the welding wire and the metal of two different workpieces to be welded together as the wire is consumed. In this way, two or more workpieces can be joined.

In some instances, the melted welding wire or portions of the workpiece can spatter and adhere to the nozzle or other torch components disposed about the torch tip. Spatter that accumulates on the nozzle contaminates it, which can block the flow of a shielding gas through the nozzle. This decreases the reliability and performance of the gas shield. Decreased performance of the nozzle and gas shield generally shortens the useable life of other various components such as the contact tip and the retaining head assembly. Additionally, welding wire spatter can accumulate on the contact tip or the retaining head assembly. When the contact tip and retaining head assembly accumulate spatter or wear out, they typically are serviced manually by an operator. Often times, contact tips are replaced and retaining heads are cleaned for reuse. While the torch is being serviced, the nozzle can also be cleaned or replaced.

Manual servicing of torch components by an operator is labor-intensive, time-consuming and generally inefficient. In some cases, the function of the torch components is actually hindered as a result of inconsistent or incomplete operator maintenance. For example, improper installation can result in several weld process-related problems, including premature contact tip failure, voltage fluctuation, and poor weld quality.

Previous attempts to automate the servicing process have not been effective. In one such attempt the nozzle is removed from the gooseneck, and a brush enters an orifice of the nozzle from which the weld wire extends (i.e., the end of the nozzle that is adjacent the workpiece). By entering from the direction of the orifice, debris and contaminants are forced further into the nozzle. Additionally, the brush insufficiently cleans the interior surface of the nozzle, leaving some spattered weld wire accumulated therein. In some prior art devices, the torch is moved to a sander or grinder that is used on the retaining head assembly to remove spatter. However, the grinder only refinishes that portion of the retaining head assembly that is in contact with the grinder. More specifically, the face (or leading edge) of the retaining head assembly positioned opposite the gooseneck, near to the contact tip, and parallel to the workpiece. In such devices, the grinder is unable to clean the other exterior surface portions of the retaining head assembly, i.e., the non-leading portions. The torch is physically moved between separate servicing stations, which requires multiple three-dimensional reference points from which to calibrate the stations to engage the various torch components.

Various tools that clean nozzles and retaining heads, replace contact tips, apply solvents, and cut welding wires are commercially available. However, these tools are often located remotely from each other, requiring the torch to move to various stations, which tends to cause delay an insufficient cleaning because of repeated station recalibration. Maintenance tools operated manually on torch systems remain susceptible to operator error and inconsistency.

SUMMARY

A need exists for automated, consistent and effective maintenance of torch systems during welding operations that can perform such tasks as removing spatter from and cleaning the nozzle, replacing the contact tip, cleaning the retaining head assembly, preventing spatter from accumulating, and cutting the weld wire to a specified length relative to the end of the contact tip that engages the workpiece. There is also a need to efficiently combine the above servicing operations with minimal relocation of the welding torch during servicing. Further, there is a need for a single apparatus to service multiple torches distributed across several welding cells, including robotic MIG torches.

The present invention relates to MIG welding torch system maintenance and solves the problem of inconsistent and time-consuming repair of torch elements by integrating all maintenance operations into a single servicing location and by automating the processes by which torch elements are maintained and by fixing a welding torch in place while major servicing operations occur. Integration and automation tend to reduce the variation in torch component maintenance. Such a configuration potentially increases the efficiency of robotic welding stations by decreasing down time and providing more accurate and reproducible maintenance results.

In one aspect an apparatus for automated servicing of a welding nozzle is provided, and the nozzle includes a first end disposed proximal to the torch rather than to the workpiece. The apparatus includes a first tool mounted on a base, and the first tool can be used to remove or replace the nozzle. The apparatus also includes a second tool that is disposed relative to the base that cleans the interior of the nozzle by entering the nozzle from the first end.

In one embodiment, the apparatus also includes a third tool that is mounted on the base, and the third tool can be used for removing or replacing the nozzle. In such an embodiment, actuation of the base can interchange the location of the first tool and the third tool. In such an embodiment, the nozzle can be replaced by a second nozzle. In another embodiment, the apparatus includes a clamping tool for securing the welding torch in a fixed location with respect to the apparatus or the base during servicing. In still another embodiment, the apparatus includes a tool that applies an anti-spatter solution to a second end of the nozzle, the end of the nozzle disposed proximal to the workpiece. In yet another embodiment, the apparatus is adapted for relocation adjacent to a second torch for servicing of the second torch.

In another aspect, an automated method for servicing a welding torch that includes a removable nozzle that has a first end proximal to the torch is provided. The method includes removing the nozzle from the torch by a first tool that is mounted on a base and cleaning the nozzle from the first end by a second tool that enters the first end of the nozzle from a location relative to the base. The method also includes replacing the nozzle.

In one embodiment, the method can include replacing the nozzle with a second nozzle using the first tool or a third tool that is mounted on the base. The method can also include securing the torch relative to the base. The cleaning can be performed substantially simultaneously with either the removing or replacing of the nozzle. The method can include applying an anti-spatter solution to the second end of the nozzle, which is disposed for proximity to the workpiece. In some embodiments, the method includes automatically repositioning the base, the first tool, and the second tool adjacent to a second torch for servicing the second torch.

In still another aspect, an apparatus is provided for automated servicing of a welding torch that includes a retaining head assembly disposed within a nozzle. The apparatus includes a first tool that can remove or replace the nozzle, and the first tool is mounted on a base. The apparatus also includes a second tool that can rotatably contact and clean the retaining head assembly while the second tool engages a surface of the retaining head assembly. The surface of the retaining head assembly can be a perimeter of the retaining head assembly. The second tool can move about the surface of the retaining head assembly. The apparatus can include a third tool, which is mounted on the base, that can remove or replace the nozzle. In such an embodiment, the base can be actuated to interchange the location of the first and third tools. The nozzle can also be replaced by a second nozzle.

In yet another embodiment, the apparatus includes a clamping tool for securing the torch in a fixed location with respect to the apparatus or the base during servicing. The apparatus can include a fourth tool that enters the first end of the nozzle to clean the interior of the nozzle. The first end of the nozzle can be disposed proximal to the torch. The retaining head assembly can include a retaining head or a diffuser. The apparatus can include a tool for cutting a welding wire near a tip of the retaining head assembly. The apparatus can include a tool for applying anti-spatter solution to a second end of the nozzle disposed oppositely the first end or a retaining head assembly. The apparatus can be adapted for automated relocation adjacent a second torch for servicing of the second torch.

In yet another aspect, an automated method of servicing a welding torch with a retaining head assembly disposed within a removable nozzle is provided that includes removing the nozzle from the torch by a first tool that is mounted on a base. The method also includes cleaning a surface of the retaining head assembly with a second tool that engages a surface of the retaining head assembly. The cleaning step can include moving the second tool about the surface of the retaining head assembly. The surface of the retaining head assembly can be a perimeter of the retaining head assembly. The method can include the step of replacing the nozzle. In such an embodiment, the nozzle can be replaced with a second nozzle by the first tool or a third tool mounted on the base.

The method can include securing the torch relative to the base. In one embodiment in which the nozzle includes a first end proximal to the torch, the method can include cleaning the nozzle from the first end with a fourth tool positioned relative to the base. The method can include applying an anti-spatter solution to a second end of the nozzle oppositely disposed the first end or the retaining head assembly. The method can include severing a weld wire near to a tip of the retaining head assembly. The method can include automatically repositioning the base, the first tool, and the second tool adjacent to a second torch for servicing thereof.

In one aspect, an apparatus for automated servicing of a welding torch that includes a contact tip disposed within a nozzle is provided. The apparatus includes a first tool, which is mounted on a base, that can remove or replace the nozzle, a clamping tool for securing the torch in a fixed location with respect to the apparatus or base during servicing, and a sub-assembly that is positioned relative to the base that removes and replaces a contact tip with a replacement contact tip obtained from a magazine that holds one or more replacement contact tips. The sub-assembly can discard the removed contact tip. The apparatus can include a second tool, which is mounted on the base, that can remove or replace the nozzle. In such an embodiment, actuation of the base can interchange the location of the first tool and the second tool. The nozzle can be replaced with a second nozzle.

In an another embodiment in which the nozzle includes a first end disposed proximal to the torch, the apparatus can include a third tool that enters the first end of the nozzle and cleans an interior of the nozzle. In one embodiment in which the torch includes a retaining head assembly disposed within the nozzle, the apparatus can include a fourth tool that rotatably contacts and cleans the retaining head assembly while the fourth tool engages a surface of the retaining head assembly. The retaining head assembly can engage a contact tip. The surface of the retaining head assembly can be a perimeter of the retaining head assembly. The apparatus can include a fifth tool for cutting a welding wire proximal to an aperture of the contact tip through which the welding wire passes or a second end of the nozzle disposed oppositely the first end. The apparatus can include a sixth tool for applying anti-spatter solution to the second end of the nozzle, the retaining head assembly or the aperture of the contact tip. The apparatus can be adapted for automated relocation adjacent to a second torch for servicing the second torch.

In another aspect, in which a welding torch includes a removable contact tip disposed within a removable nozzle, an automated method for servicing a welding torch is provided. The method includes securing the torch in a fixed location relative to the base, removing the nozzle from the welding torch with a first tool mounted on a base, removing the contact tip with a sub-assembly positioned relative to the base, obtaining with the sub-assembly a replacement contact tip from a magazine that holds one or more replacement contact tips, and securing with the sub-assembly the replacement contact tip to a retaining head assembly. The method can include discarding the contact tip by the sub-assembly. The method can include replacing the nozzle. In such an embodiment, the nozzle can be replaced with a second nozzle by the first tool or a third tool mounted on the base.

In an embodiment in which the nozzle includes a first end proximal to the torch, the method includes cleaning the nozzle from the first end with a tool positioned relative to the base. The method can include cleaning a surface of the retaining head assembly with a fourth tool that contacts the surface of the retaining head assembly. The surface of the retaining head assembly can include a perimeter of the retaining head assembly. In an embodiment in which the contact tip includes an aperture with a welding wire passing therethrough, the method can include severing the wire near a second end of the nozzle or the aperture. The method can include applying an anti-spatter solution to the second end of the nozzle, the retaining head assembly or the contact tip. The method can include automatically repositioning the base, the first tool, the sub-assembly, and the magazine adjacent to a second torch for servicing of the second torch.

In another aspect, an apparatus for automated servicing of a welding torch is provided where the torch includes a contact tip secured to a retaining head assembly, both of which are disposed within a removable nozzle with a first end proximal to the torch and a second end distal from the torch. The apparatus includes a base, a clamping tool for securing the torch in a fixed location with respect to the apparatus or the base, a first tool mounted on the base that can remove or replace the nozzle, a second tool mounted on the base that can remove or replace the nozzle and whose location can be interchanged with the first tool by actuation of the base, a third tool that enters the first end of the nozzle and cleans the interior of the nozzle, a fourth tool that rotatably contacts and cleans the retaining head assembly while the fourth tool engages a surface of the retaining head assembly, and a sub-assembly positioned relative to the base that can remove a contact tip, obtain a replacement contact tip from a magazine and secure the replacement contact tip to the torch. The apparatus can include a fifth tool for applying an anti-spatter solution to the second end of the nozzle, the retaining head assembly or the replaced contact tip. The apparatus can include a sixth tool for severing a welding wire near the second end of the nozzle or an aperture of the contact tip.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
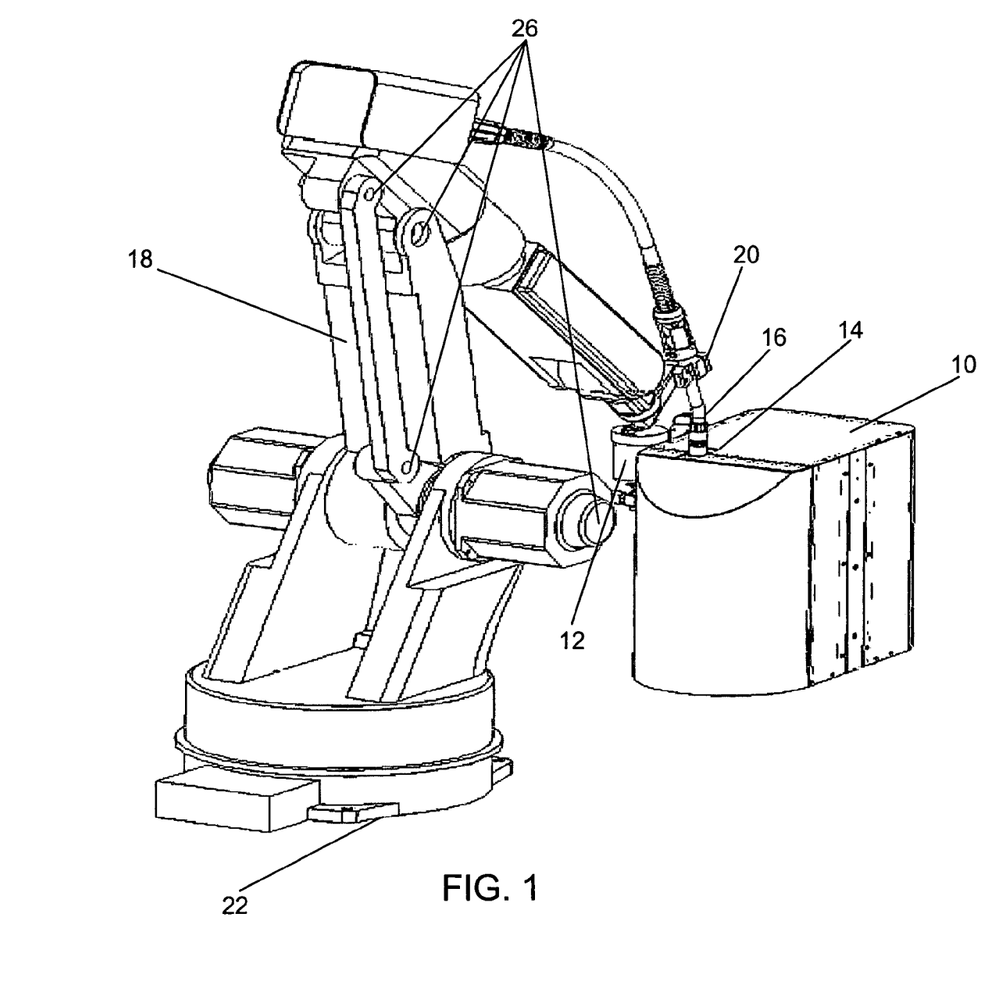
FIG. 1 depicts an apparatus for servicing a robotic MIG torch.

FIG. 1 depicts an apparatus for servicing a robotic MIG torch according to an embodiment of the invention. The various tools that perform automated servicing operations on the welding torch can be generally located within a housing 10. In some embodiments of the invention, various tools can be positioned exterior to a housing 10. For example, a tool 12 for applying anti-spatter solution is depicted exterior to the housing 10 and secured thereto in FIG. 1. The housing 10 defines an opening 14 that permits a torch to access the tools inside the housing 10. In an embodiment of the invention, a MIG welding torch 16 is operated by a robot or a robotic arm 18. In such an embodiment, a mount 20 fixedly engages a portion of the torch 16 and couples the torch to the robot 18. The robot 18 is supported by a support member 22 that can be secured to a surface such as a floor of a welding cell, or the robot 18 can be unsecured, free-standing or movable. The robot 18 includes various pivots 26 that generally allow the robot 18 to move the torch 16 three-dimensionally. The movement of the robot 18 can be generally controlled by software executing on a computer (not shown) specifically, software commands direct the various portions of the robot 18 to move in specified directions. In a particular embodiment, the software directs the robot 18 to position the torch 16 relative to the opening 14, a portion of the torch 16 passing therethrough. Additionally, the control means (i.e., a local programmable circuit or custom circuit board) that directs the robot 18 to move can control the inputs and outputs on the apparatus. The various functionalities of the depicted apparatus can be integrated with existing pneumatic and electrical control systems present in a weld cell during a welding application.

Figure 2:
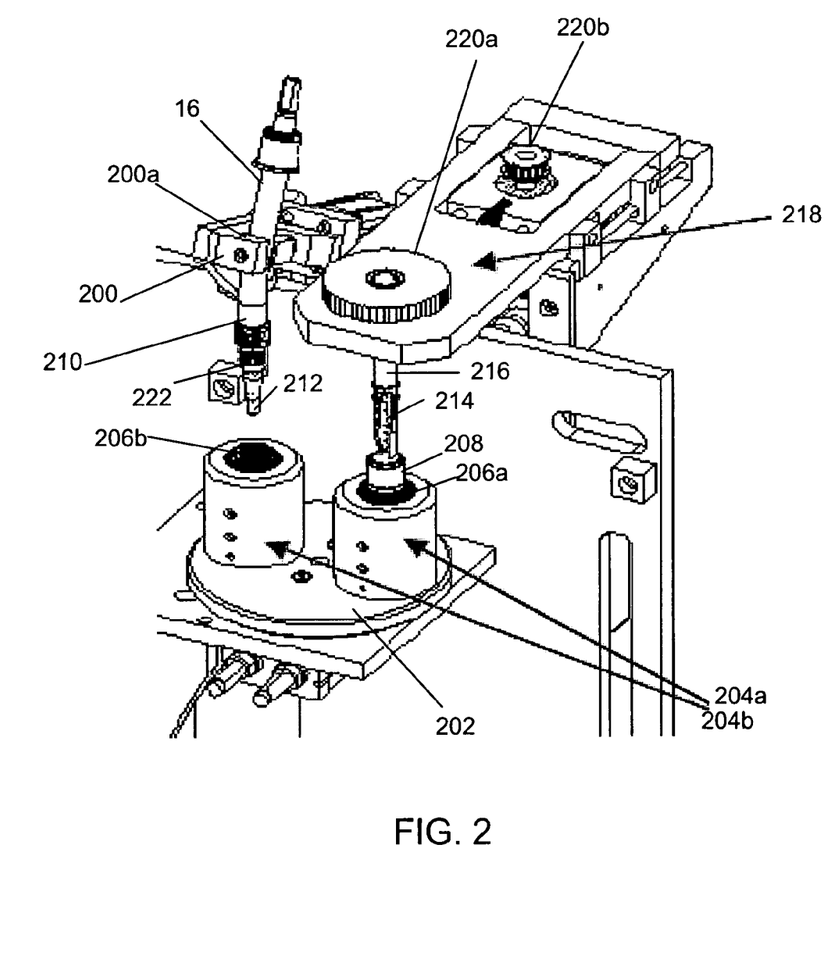
FIG. 2 depicts an apparatus for servicing a welding torch nozzle.

FIG. 2 depicts an apparatus for servicing a welding torch nozzle from a first end of the nozzle that is disposed proximal to the torch according to an embodiment of the invention. The apparatus includes a clamping tool 200, that secures a torch 16. The clamping tool 200 can define a torch-receiving portion 200a and a securing portion for fixedly constraining the torch with respect to the apparatus, particularly with respect to the base 202. The receiving portion 200a can be of any configuration that allows the torch 16 to pass therethrough. In the illustrated embodiment, the receiving portion is an open-sided U-shape, but the invention is not limited to this configuration and can include, e.g., a one-sided I-shape, a two-sided L-shape, a four-sided box-shape, or a contoured shape. The securing portion can be any configuration that fixedly constrains the location of the torch 16. In the depicted embodiment, the securing portion of the clamping tool 200 secures the torch 16 to the receiving portion using a set-screw tightened against the torch 16. However, the invention is not limited to this configuration and can include, e.g., a magnet or an electromagnet for engaging metal portions of the torch, a threaded engagement to the torch 16, a plurality of plates disposed with an inflatable sleeve, or a V-block with a clamp.

As illustrated, the torch servicing apparatus can include a base 202 with a first tool 204a mounted thereon. The first tool 204a includes an envelope 206a for receiving and engaging a nozzle 208. In a particular embodiment, the envelope 206a includes plates disposed over an inflatable sleeve that when inflated enables the plates to tightly engage the nozzle 208. Embodiments include the envelope 206a having three semi-spherical plates fitted within an inflatable sleeve. The plates can be configured to surround the nozzle 208. Air can be introduced into the sleeve and can compress the plates against the nozzle 208, securing the nozzle 208 without damaging the exterior surface thereof.

After the envelope 206a of the first tool 204a engages the nozzle 208, the first tool 204a can be configured to loosen the connection between the nozzle 208 and the gooseneck 210 of the torch 16. The first tool 204a can also be configured to replace the nozzle 208 by securing it to the gooseneck 210 of the torch 16. In a particular embodiment, the first tool 204a can be generally aligned with the nozzle 208 along an axis defined by the nozzle 208. To remove the nozzle 208, the first tool 204a can rotate about the axis to disengage a threaded portion of the nozzle 208 from a threaded portion of the gooseneck or a retaining head assembly. Similarly, to secure the nozzle 208 to the torch, the first tool 204a can rotate in the opposite direction about the same axis, engaging the threaded portion of the nozzle 208 to the threaded portion of a gooseneck or retaining head assembly, tightened to a particular torque. The nozzle 208 generally has two ends, a first end and a second end. The first end is proximal or near the gooseneck 210; whereas, the second end is distal from the gooseneck and proximal to the contact tip 212 and the workpiece. The two ends can define a longitudinal axis. In a particular embodiment, the second end of the nozzle 208 is adjacent to the base 202 when the first tool 204a removes the nozzle 208 from the torch 16. The apparatus can also include a second tool, a "cleaning tool", 214 that can operate independently and asynchronously from the base 202.

In some embodiments, the base positions the first tool 204a in a location such that the cleaning tool 214 can enter the first end of the nozzle 208 to clean the nozzle after the first tool 204a removes the nozzle 202 from the torch 16. In one embodiment, a shaft 216 engages the cleaning tool 214 and couples to an assembly 218 for driving the cleaning tool 214. In the illustrated embodiment, the cleaning tool 214 is supported by assembly 218, which includes a wheel 220a in communication with a second wheel 220b. Wheel 220b is driven, e.g., by a rotary motor (not shown), or a motor with a rotary output, and is in communication with wheel 220a via a belt (not shown) that causes wheel 220a to rotate in response to the rotation of wheel 220b. Other means known in the art can be used to drive the cleaning tool 214, for example a rack and pinion, or directly coupling the cleaning tool 214 to a rotary motor.

In some embodiments, the base 202 actuates, enabling the first tool 204a, which engages the nozzle 208 to longitudinally translate the nozzle along the length of the cleaning tool 214. In such an embodiment, the cleaning tool 214 passes from the first end of the nozzle 208 to the second end of the nozzle 208, thus cleaning the interior of the nozzle 208 of welding wire splatter and other contamination and forcing slag out the second end of the nozzle 208. In another embodiment, the first tool 204a actuates, which longitudinally translates the nozzle 208 along the length of the cleaning tool 214. In some embodiments, the cleaning tool 214 can longitudinally translate along an interior surface of the nozzle 208 to clean it. In some embodiments, the cleaning tool 214 plunges through the second end of the nozzle 208, hence cleaning the orifice of the nozzle in the process. The cleaning tool 214 can include, for example, a reamer, a drill bit, a milling tool, or a brush. A single servicing apparatus can employ more than one type of cleaning tool 214 with a change effected by disengaging the cleaning tool 214 from the shaft 216 and re-engaging a different type of cleaning tool to the shaft 216.

Still referring to FIG. 2, a third tool 204b for engaging a nozzle 208 can be provided. The third tool includes an envelope 206b for engaging a nozzle similar to the envelope 206a described with respect to the first tool 204a. Envelope 206b can employ the same means of engaging a nozzle 208 as the first envelope 206a, but others techniques for engaging the nozzle can be used. Further, the third tool 204b can include similar attributes to engage and loosen the nozzle 208 as well as to tighten the nozzle 208 to a specific torque, as described above with respect to the first tool 204a. The third tool 204b, as depicted, is mounted on the base 202. In a particular embodiment, the first tool 204a and the third tool 204b are mounted on opposing sides of the same face of the base 202, which allows actuation to interchange the location of the first tool 204a and the third tool 204b. More specifically, if the base 202 is rotated 180°, the position formerly occupied by the first tool 204a will be occupied by the third tool 204b. Repositioning the first tool 204a and the second tool 204b allows the torch 16 to be serviced while it is secured by the clamping tool 200. A fixed torch provides a single three-dimensional reference point from which various tools of the apparatus can be oriented and directed.

In some embodiments the first tool 204a can be positioned to engage the nozzle 208, and the third tool 204b is positioned to engage the cleaning tool. In such embodiments, the third tool 204b can engage a second nozzle (not shown). When the assembly 218 that drives cleaning tool 214 is activated, the base 202 can actuate towards the torch 16 to permit the first tool 204a to engage the nozzle 208, and the second nozzle engaged by the third tool 204b is cleaned by tool 214 substantially simultaneously. The base 202 can then move the first tool 204a away from the torch 16 and likewise moves the third tool 204b away from the cleaning tool 214. The position of the first tool 204a and the third tool 204b can then be interchanged by rotating the base 202 180°. Although rotation about a central axis of the base 202 is described, other movement patterns known in the art are also applicable. After rotation, the base 202 can be moved toward the torch for a second time. The second nozzle (not shown) engaged by the third tool 204b can then be secured to the torch 16 as described above with respect to the first nozzle 208. This configuration reduces servicing time because a second nozzle is cleaned as a first nozzle 208 is removed from the torch 16, which reduces the number of times a nozzle is repositioned.

The cleaning tool 214 can be repositioned so that the cleaning tool 214 does not engage nozzle 208 when the base 202 actuates for the second time. In the illustrated embodiment, the assembly 218 defines an opening along which the assembly 218 is able to slide, allowing repositioning of cleaning tool 214. In a particular embodiment, after the nozzle 208 has been cleaned and after the nozzle 208 or a second nozzle (not shown) has been replaced, the securing portion of the clamping tool 200 can release the torch 16, and the robot 18 can remove the torch 16 from the apparatus. Optionally, the robot can reposition the torch 16 near tool 12 so that tool 12 can apply anti-splatter solution to the nozzle and components disposed about the nozzle as described in more detail below.

In the illustrated embodiment of FIG. 2, the first tool 204a and the second tool 204b are depicted. However, the method of the present can be carried out employing only the first tool 204a mounted on the base 202. That is, the first tool 204a can remove the nozzle 208, engage the cleaning tool 214 and replace the nozzle 208. In an embodiment in which the nozzle 208 has been removed from the torch 16, the components disposed within the nozzle are exposed, namely the retaining head assembly 222 and the contact tip 212. In some embodiments, the retaining head assembly 222 includes the contact tip 212. The contact tip 212 can be secured to the retaining head assembly 222, which in turn can be secured to the gooseneck 210. The retaining head assembly 222 can include a retaining head or a gas diffuser. The retaining head assembly defines a tip that can be proximal to the workpiece during torch operation. A gooseneck 210 can include both a set of external threads disposed on an exterior surface of the gooseneck 210 and a set of inside threads disposed on an interior surface of the gooseneck 210. In an embodiment in which the retaining head assembly 222 includes a retaining head, an interior threaded region (i.e., inside threads) of the retaining head assembly 222 threadably engages an exterior threaded surface (i.e., external threads) of the gooseneck 212. In an embodiment in which the retaining head assembly 222 includes a gas diffuser, an exterior threaded region (i.e., external threads) of the retaining head assembly 222 threadably engages a threaded interior surface (i.e., inside threads) of the gooseneck 212.

Figure 3:
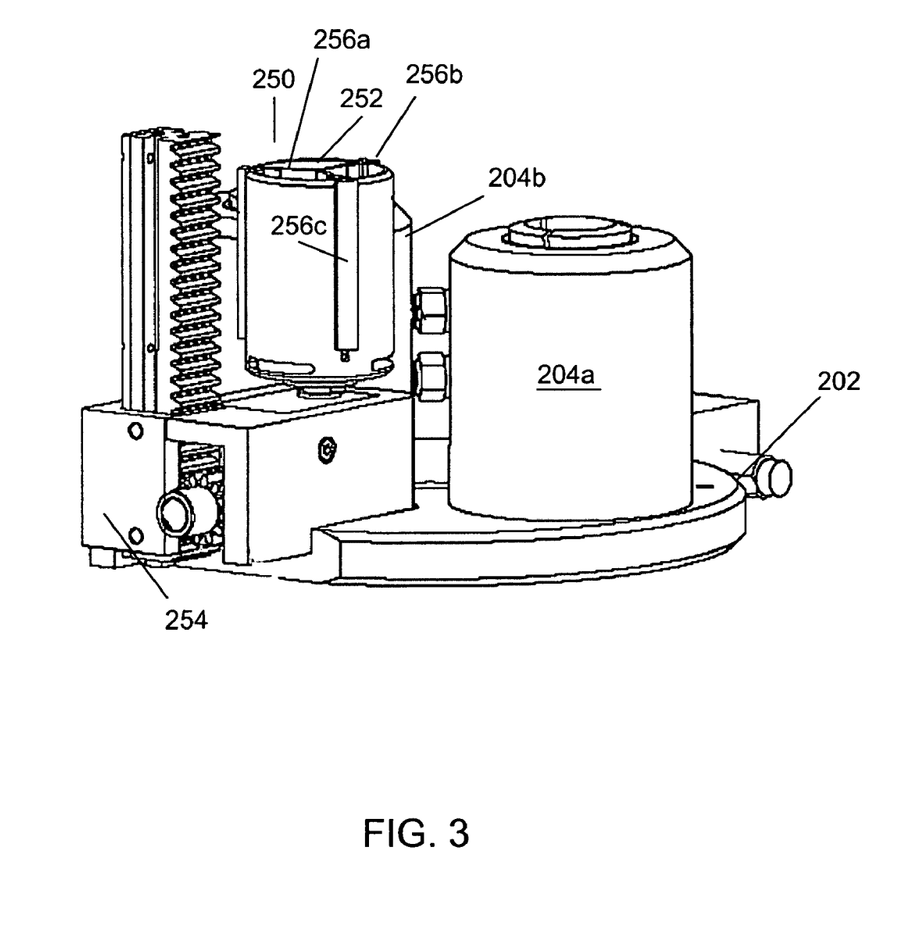
FIG. 3 illustrates an apparatus for servicing a welding torch that includes a tool for cleaning a retaining head assembly.

FIG. 3 illustrates an apparatus for servicing a welding torch according to another embodiment of the invention including a tool for cleaning a retaining head assembly. In one embodiment, the robot (not shown) positions the torch 16 for securing by the clamping tool 200 as described above with respect to FIG. 2. After the position of the torch 16 has been secured, creating one three-dimensional reference point for the various tools, the nozzle 208 can be removed by the first tool 204a as described above with respect to FIG. 2, thereby exposing the retaining head assembly 222. The retaining head assembly 222 generally defines a surface. In one embodiment, the surface is the interior of the retaining head assembly 222. In another embodiment, the surface of the retaining head assembly is a perimeter of the retaining head assembly 222. In a particular embodiment, an assembly cleaning tool 250 is provided for cleaning a retaining head assembly 222. The assembly cleaning tool 250 can include a recessed portion 252. In such an embodiment, the assembly cleaning tool 250 can be mounted on a support member that can be coupled to a driver 254 that rotates the assembly cleaning tool 250. In the illustrated embodiment, the support member is coupled to a rack and pinion driving assembly. The driver can include a rotary motor or other suitable configurations known in the art.

In one embodiment, while the assembly cleaning tool 250 is rotating, it engages a surface of the retaining head assembly 222 to clean the surface. The assembly cleaning assembly cleaning tool 250 contacts the portion of the retaining head assembly 222 that is exposed after removal of the nozzle 208 to clean spattered welding wire or debris from the retaining head assembly. More specifically, the recessed portion 252 of the assembly cleaning tool 250 can contact the retaining head assembly. In the illustrated embodiment, the assembly cleaning tool 250 and driver 254 are mounted on the base 202, which acts as the support member described above, at a position 90° from the first tool 204a and the third tool 204b. In such an embodiment, after the first tool 204a has removed the nozzle 208 from the torch 16 as described above and after the first tool 204a has been moved away from the torch, the base can be rotated by 90° (or 270° oppositely oriented) to position the assembly cleaning tool 250 relative to the exposed retaining head assembly 222 for cleaning. The base 202 can then be moved toward the exposed retaining head assembly 222 to allow the assembly cleaning tool 250 to rotatably engage the retaining head assembly as described above.

The assembly cleaning tool 250 can be mounted on the base 202, but this is not required. For example, the assembly cleaning tool 250 can be mounted on a separate support (not shown) that actuates the assembly cleaning tool 250 such that the assembly cleaning tool 250 rotatably engages the surface of the retaining head assembly 222 independent of the movement of the base 202. Moreover, although the first tool 204a and the second tool 204b are depicted as mounted on the base 202, the principles of the invention can be achieved by employing only the first tool 204a. In such an embodiment, the assembly cleaning tool 250 can be mounted on the base 202 with the first tool 204a at a location other than 90°, for instance the location occupied by the second tool 204b in FIG. 3, or the assembly cleaning tool 250 can be mounted on a separate support.

In some embodiments, the assembly cleaning tool 250 moves about the surface of the retaining head assembly 222 as the assembly cleaning tool 250 rotatably engages the retaining head assembly. For example, the assembly cleaning tool 250 can include a cleaning portion and a shaft that is coupled to the driving means. In addition to the driving means rotating the shaft, which in turn rotates the cleaning portion of the assembly cleaning tool 250 about an axis of the shaft, the shaft itself or the means supporting the assembly cleaning tool 250 can rotate radially about the surface (e.g., a perimeter surface) of the retaining head assembly 222. In the illustrated embodiment of the present invention, the assembly cleaning tool 250 includes a recessed portion 252 adapted to receive a retaining head assembly 222 upon actuation by a support member toward the retaining head assembly 222. Prior to the retaining head assembly engaging the recessed portion 252, the driving means coupled via the shaft to the assembly cleaning tool 250 can be activated, causing the assembly cleaning tool 250 to rotate. The interior surface of the recessed portion 252 thus rotatably engages the surface of the retaining head assembly 222 during actuation both towards and away from the torch. In a particular embodiment, the recessed portion 252 of the assembly cleaning tool 250 includes three squeegee blades 256a-c secured to the cleaning tool 250. As the recessed portion 252 rotatably contacts the retaining head assembly 222, the squeegee blades can remove debris using frictional and torsional forces. In other embodiments, the recessed portion 252 can include a buffer pad, a sanding pad, a grinding pad, steel wool, other abrasives, and/or a heating element for melting accumulated welding wire spatter. The recessed portion 252 can also include a bristled element including horse-hair, nylon, or metal bristles, but the bristled element is not limited to these materials.

In a particular embodiment, the nozzle 208 is cleaned by the first tool 204a or the third tool 204b in the manner described above with respect to FIG. 2. After the retaining head assembly 222 has been cleaned, the nozzle 208 can be replaced by either the first tool 204a or the second tool 204b as described above with respect to FIG. 2.

Figure 4:
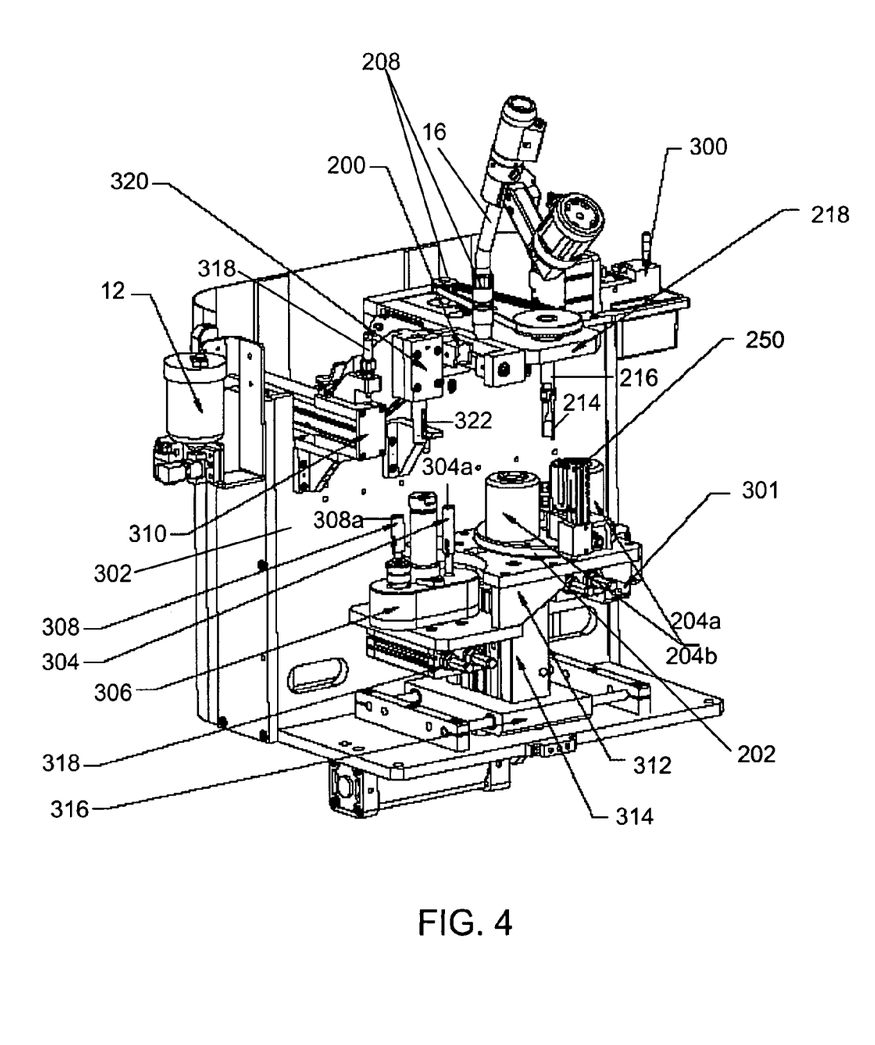
FIG. 4 depicts an apparatus for servicing a welding torch including a sub-assembly to replace a contact tip and to cut a welding wire.

FIG. 4 depicts an apparatus for servicing a welding torch including a sub-assembly to replace a contact tip and to cut a welding wire according to an embodiment of the invention. In the illustrated embodiment, the apparatus includes a tool 12 for applying an anti-spatter solution to the torch 16 and a tool 300 for severing the welding wire at a predetermined length. In one embodiment, the robot positions the torch 16 near the apparatus for securing by the clamping tool 200, e.g., as described above with respect to FIG. 2. In such an embodiment, the nozzle 208 is removed and cleaned as described above by first tool 204a or third tool 204b and by the cleaning tool 214, e.g., as described above with respect to FIG. 2. Optionally, the retaining head assembly 222 can be cleaned by assembly cleaning tool 250 as described above with respect to FIG. 3. In one embodiment, the retaining head assembly 222 is cleaned before the contact tip 212 is replaced. In other embodiments, the retaining head assembly 222 is cleaned after the contact tip 212 has been replaced. In the illustrated embodiment, a driver 301 for actuating or rotating the base 202 is depicted and can include a cylinder coupled to a driver or other techniques for actuating or rotating a base 202.

In a particular embodiment, a sub-assembly 302 is employed to replace a contact tip 212 of the torch 16. The contact tip 212 is disposed within the nozzle 208 and is exposed when the nozzle 208 is removed by the first tool 204a, 204b. In one embodiment, the sub-assembly 302 includes a first tip tool 304 that is capable of removing and discarding the contact tip 212 from the torch 16. In the illustrated embodiment, the first tip tool 304 is mounted on a rotatable base 306. A second tip tool 308 is also mounted on the rotatable base 306. The rotatable base 306 can be moved to position the first tip tool 304 or the second tip tool 308 near the torch 16, particularly near the retaining head assembly 222. The sub-assembly 302 can also include a magazine 310 that stores one or more replacement contact tips. The magazine is described in greater detail with respect to FIG. 5. In a particular embodiment, the first tip tool 304 or the second tip tool 308 is positioned through actuation of the rotatable base 306 near the magazine 310 to obtain a replacement contact tip. After obtaining a replacement contact tip, the first tip tool 304 or the second tip tool 308 can be positioned near the torch 16 for securing or attaching the replacement contact tip to the torch 16.

In the illustrated embodiment, the rotatable base 306 and base 202 are mounted on the same support member 312. In such an embodiment, the support member 312 can be moved toward to the torch 16 by a "lift" member 314, and can be moved transverse to the torch by a "slide" member 316. Lift member 314 and slide member 316 can be driven by a motor, a piston, or other driving means known in the art. In another embodiment, the rotatable base 306 and the base 202 are mounted to different support members and are capable of individual movement toward and away from the torch 16. In one embodiment, the sub-assembly can include a driver 318 for actuating the rotatable base 306 independent of base 202. In the illustrated embodiment, the driver 318 is a rotary actuator, but other means of driving may be employed without departing from the scope of the invention.

In one embodiment, the rotatable base 306 positions the first tip tool 304 near the contact tip 212 of the torch 16. The rotatable base 306 can actuate the first tip tool 304 into contact with the contact tip 212. In such an embodiment, the first tip tool 304 engages the contact tip 212 by securely gripping or locking onto the contact tip 212 without damaging it. The first tip tool 304 can remove a contaminated or used contact tip 212, which is ultimately discarded from the sub-assembly 302 if preservation of the contact tip 212 is not a concern. In a particular embodiment, the first tip tool 304 includes an envelope portion 304a for receiving the contact tip 212 during engagement. The envelope portion 304a can include a cam bearing fitting for engaging an exterior surface of the contact tip 212. The envelope portion 304a can also include engaging components such as spiral cutting blades, multiple metal plates in conjunction with an inflatable sleeve, or other fixed grip holders that will not damage the exterior of the contact tip. After the envelope portion of the first tip tool 304 engages the contact tip, the first tip tool can be rotated to disengage the contact tip 212 from the retaining head assembly 222, thereby disengaging the threaded portion of the contact tip 212 from the threaded portion of the retaining head assembly 222.

In a particular embodiment, after the contact tip 212 has been removed by the first tip tool 304, the contact tip 212 is discarded. The first tip tool 304 can discard the contact tip 212 by disengaging the exterior surface of the contact tip 212 and by forcing the contact tip to leave the envelope portion 304a. The first tip tool 304 can provide a channel (not shown) through which air is forced, causing the contact tip 212 to be expelled from the envelope portion 304a. In another embodiment, the first tip tool 304 can be reoriented to allow gravity to remove the contact tip 212 from the envelope portion 304a. In still another embodiment, the contact tip 212 can be secured, by for example a holder (not shown), while the first tip tool 304 is moved in a direction away from the contact tip. In such an embodiment, after the first tip tool 304 has been moved away from the contact tip 212, the component securing the contact tip 212 can release the contact tip 212, the contact tip can drop to the ground because of gravity or because it no longer has lateral support. In the illustrated embodiment, the apparatus includes a contact tip ejector unit 320 for ejecting the contact tip from the sub-assembly 302. In some embodiments, a contact tip tool 304, 308 can be moved into a position to allow a gripping portion 322 of the ejector unit 320. The gripping portion 322 can be configured to engage a spent contact tip using engaging techniques described above. In such an embodiment, the tip tool 304, 308 can disengage the spent contact tip after the gripping portion 322 engages it. The tip tool 304, 308 can then be moved away from the ejector unit 320, and the gripping portion 322 can disengage and release the spent contact tip.

After the contact tip 212 has been removed and discarded, a replacement contact tip can be obtained from a magazine 310 that stores replacement contact tips. In one embodiment, the first tip tool 304 is moved toward the magazine 310, and a receiving end of the envelope portion 304a of the tip tool 304 engages the magazine 310. After the receiving end of the envelope portion 304a engages the magazine, the magazine 310 releases a replacement contact tip, which falls or is forced through an aperture into the envelope portion 304a. The first tool 304 can then be repositioned near the torch 16, e.g., near the retaining head assembly 222 of the torch 16. The first tool 304, which engages the replacement contact tip, can be positioned such that the replacement contact tip threadably engages the retaining head assembly 222. The first tool 304 can then be rotated about an axis defined by the replacement contact tip to allow threads disposed on the exterior surface of the replacement contact tip (i.e., external threads) to engage threads disposed on an interior surface of the retaining head assembly 222, i.e., inside threads, thus securing or attaching the replacement contact tip to the torch 16. After securing the replacement contact tip to the torch 16, the first tip tool 304 is actuated away from the torch 16. The nozzle is replaced and secured to the torch 16, e.g., employing the method described above with respect to FIG. 2.

In embodiments employing the above concepts with respect to FIG. 4, a single servicing tool 304 can remove the contact tip 212, discard the contact tip 212, obtain a replacement contact tip from the magazine 310 and secure the replacement contact tip to the torch 16. In some embodiments, the second tip tool 308 contains an envelope portion 308a configured for receiving a replacement contact tip from the magazine 310 similar to the envelope portion 304a of the first tip tool 304. Upon actuation of the second tip tool 308 near the magazine 310, the second tip tool 308 can obtain a replacement contact tip from the magazine 310. In such an embodiment, the first tip tool 304 removes the contact tip 212 from the torch 16 and discards the contact tip as described above. The position of the second tip tool 308 can be interchanged with that of the first tip tool 304. In one embodiment, the position of the tools 304 and 308 can be interchanged by rotating base 306 about a central axis normal to the base, although other means of exchanging the position of the first tip tool 304 and the second tip tool 308 known in the art can be used. The second tip tool 308 can then be positioned near the torch, and the second tip tool 308 can secure the replacement contact tip to the torch, e.g., as described above with respect to the first tip tool 304. As described above with respect to FIG. 2, the assembly 218 that supports the cleaning tool 214 can be slideably repositioned to avoid interference between the sub-assembly 302 and the cleaning tool 214.

Figure 5:
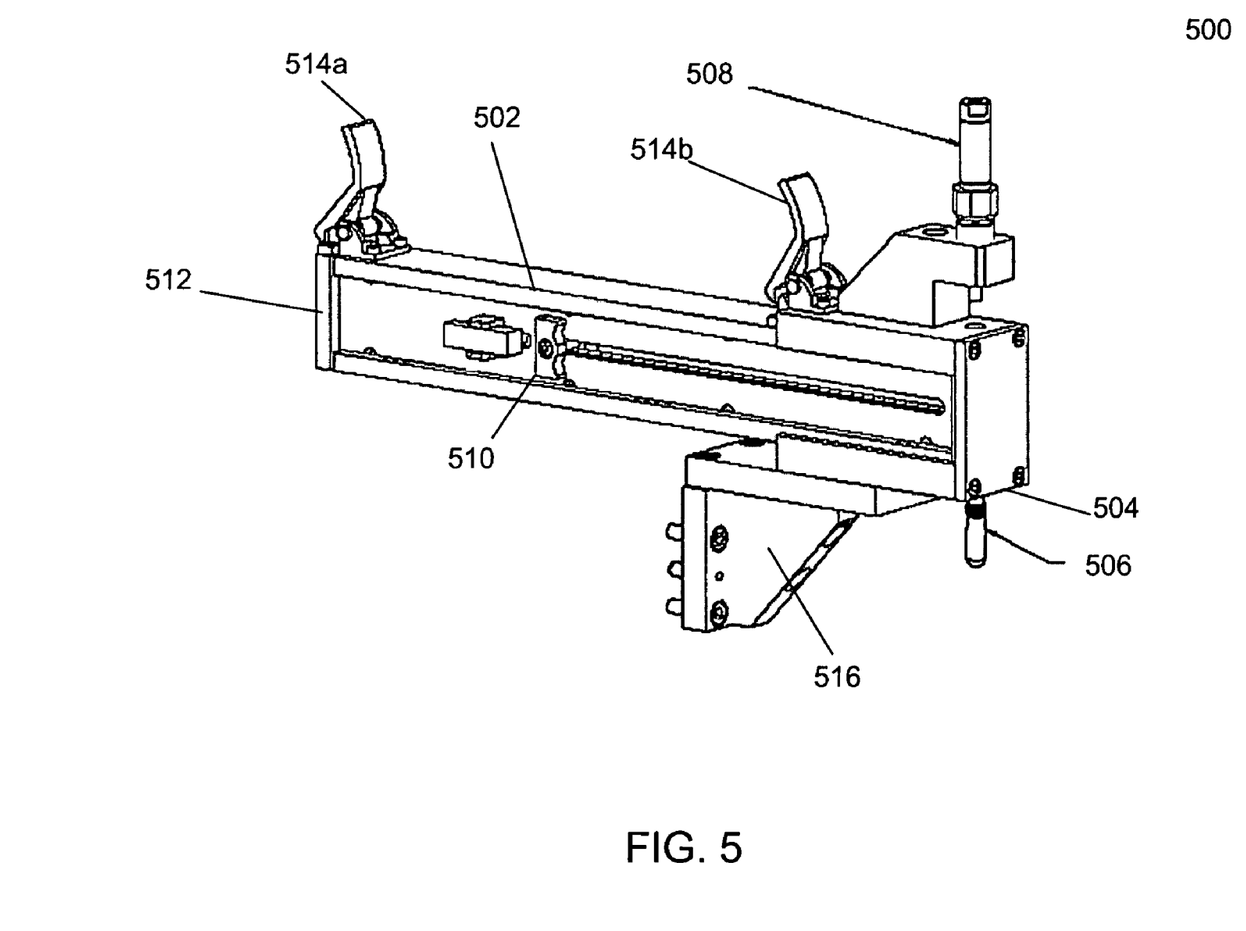
FIG. 5 depicts a magazine employed by a sub-assembly for replacing a contact tip.

FIG. 5 depicts a magazine 500 employed by a sub-assembly for replacing a contact tip according to an embodiment of the invention. The magazine can store one or more replacement contact tips to be provided to the first or second tip tool 304, 308. In one embodiment, the magazine 500 includes a housing 502 with the replacement contact tips disposed therein. The housing can also define an aperture 504. The first or second tip tool 304, 308 can be actuated into a position such that the envelope portion 304a, 308a engages the aperture 504. A replacement contact tip 506 can then pass through the aperture 504 and into the envelope portion 304a, 308a. The first or second tip tool 304, 308 can then be actuated away from the aperture 504 and toward the retaining head assembly to secure the replacement contact tip 506 thereto. In one embodiment, gravity forces a replacement contact tip 506 through the aperture 504 and into the envelope portion 304a, 308a. In a particular embodiment, a plunger 508 can be mounted on the housing 502 in a position opposed to the aperture 504. After a replacement contact tip is positioned adjacent to the aperture 504, the plunger 508 forces the replacement contact tip 506 through the aperture 504 and into the envelope portion of the first or second tip tool 304, 308.

In the illustrated embodiment, the magazine 500 includes a spring within the housing 502 that can be biased towards the aperture 504. The spring can circumscribe a piston part and can engage a forcing block 510. The forcing block 510 contacts an adjacent replacement contact tip and drives the "stack" of replacement contact tips away toward the aperture 504 for dispensing into the first or second tip tool 304, 308. The spring also engages a rear wall 512 of the housing 502. The magazine 500 can be designed and constructed to be removable from the sub-assembly. In the illustrated embodiment, the magazine 500 includes two securing clamps 514a, 514b that secure a portion of the housing 502 into position relative to the plunger 508. The securing clamps 514a, 514b can be released to allow the movable portion of the housing 502 to be translated in the direction of the rear wall 512. In such a configuration, multiple replacement contact tips can be replenished to the vacated area between the forcing block 510 and the aperture 504. As such, the magazine can be removed from the sub-assembly and refilled with replacement contact tips at a location remote from the other servicing tools. In one embodiment, portions of the magazine can be secured to the apparatus via a mounting bracket 516.

Figure 6:
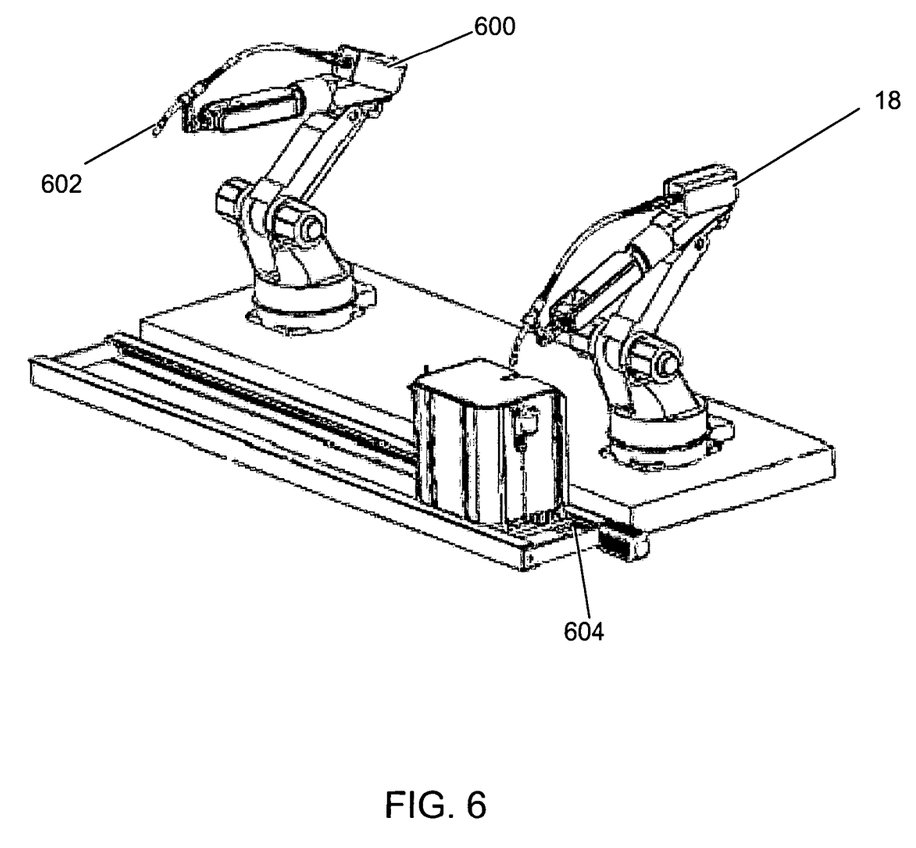
FIG. 6 depicts an apparatus for servicing a plurality of robotic MIG welding torches.

FIG. 6 depicts an apparatus for servicing a plurality of robotic MIG welding torches. Generally, the invention can achieve economies of scale by configuring a single apparatus to service a plurality of robotic welding torches located in one or more welding cells. In a particular embodiment, the apparatus engages a robot 18, e.g., as described above with respect to FIG. 1. After the servicing apparatus completes servicing of the robot 18, the robot 18 removes the torch 16 from the opening 14 defined by the housing 10. In such an embodiment, the apparatus can be adapted to automatically relocate to a second welding torch for servicing of the second torch. After the apparatus has been automatically relocated, a second robot 600 positions a second torch 602 for servicing by the apparatus by substantially the same process as described above with respect to robot 18. The apparatus then can then begin servicing of the second torch 602 as described herein. In the illustrated embodiment, the apparatus rests atop a sliding gantry 604 that can allow the apparatus to be driven from the first robot 18 to the second robot 600 employing a driver as described above. In still other embodiments, the apparatus can be adapted for automatic relocation employing wheels, a slide, rails or other configurations capable of relocating an apparatus from a first point near a first robot 18 to a second point adjacent a second robot 600. In one embodiment, the movement of the servicing apparatus can be controlled by software that controls the robots 18 and 600, or by software controlling only the servicing apparatus.

Figure 7:
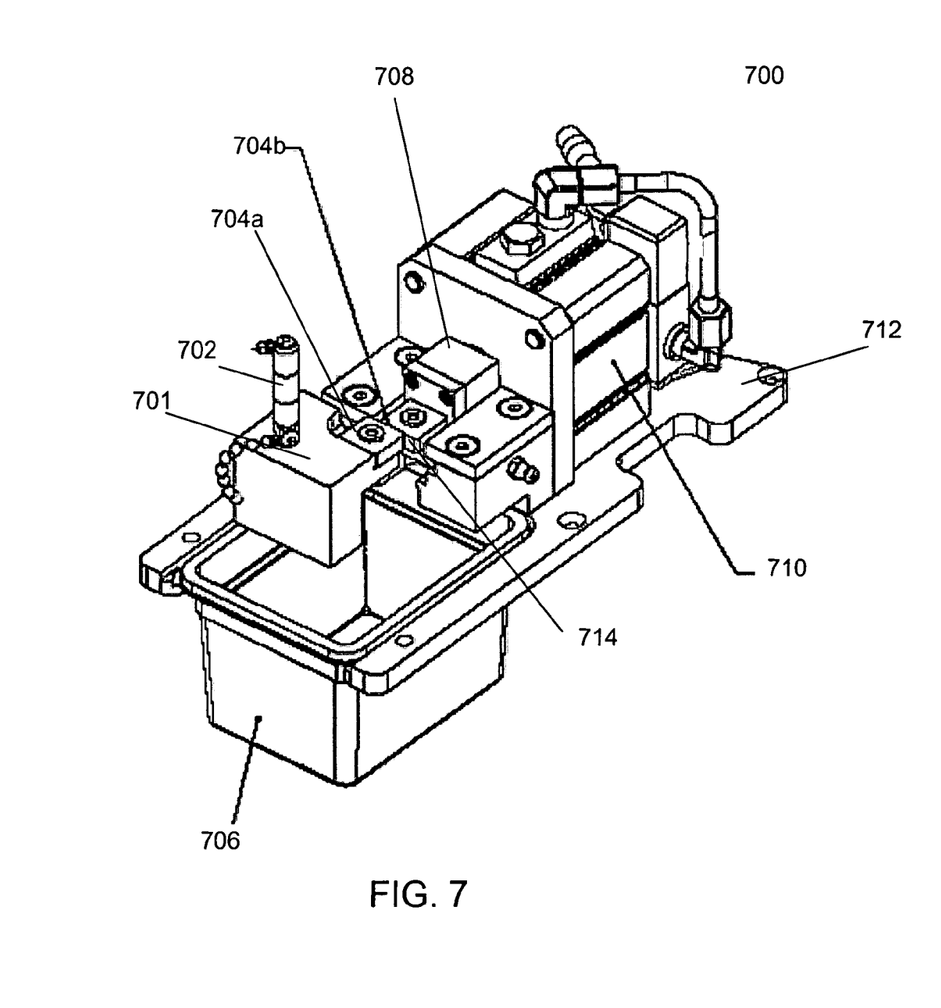
FIG. 7 depicts a tool for severing welding wire.

FIG. 7 depicts a tool 700 for severing welding wire according to an embodiment of the invention. As depicted the tool 700 includes a fixed base 701, and the base 701 includes a torch seat 702 and a fixed blade 704a. In the illustrated embodiment, a reservoir 706 for storing severed welding wire is positioned below the base 701, but the reservoir 706 is not required. In one embodiment, the base 701 can be fixed relative to a movable blade 704b that can be coupled to a blade holder 708. The blade holder 708 can be coupled to a driver (not shown) disposed within a housing 710. In one embodiment, the driver can be a pneumatic cylinder that forces the housing 708 towards the fixed blade 704a, but other drivers can be used. In one embodiment, the tool 700 can be actuated to a position near the nozzle or contact tip of the welding torch in order to sever the welding wire while the torch is still secured in a fixed location, for example, by coupling an actuator to the a support member 712 on which the various components are mounted. The actuation of the tool can be driven by a plurality of drivers, including multiple driving motors for actuating the housing through three dimensions, e.g., as discussed above. In another embodiment, the torch can be repositioned such that the nozzle or the contact tip engages the seat 702, with the orifice or tip thereof disposed over an opening 714 defined by the separation between the fixed blade 704a and the movable blade 704b. In one embodiment, the welding wire can be extended from the nozzle or contact tip towards the reservoir 706. After the welding wire is positioned between the two blades 704a, 704b, the driver can move the movable blade 704b into cutting contact with the fixed blade 704a, thus severing portion of the welding wire. In some embodiments, the cutting blades 704a, 704b are not collinear or coplanar. In a particular embodiment, the blades can be formed from indexable carbide, but other materials may be used without departing from the scope of the invention.

Figure 8:
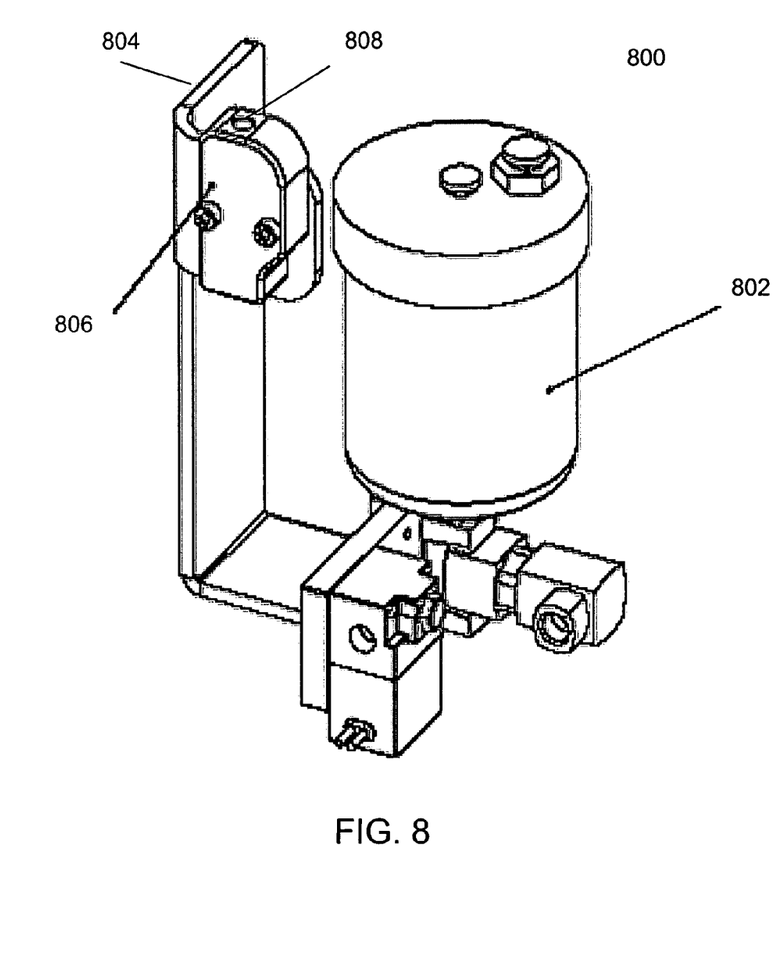
FIG. 8 depicts a tool for applying anti-spatter solution to various torch components.

FIG. 8 depicts a tool 800 for applying anti-spatter solution to various torch components according to an embodiment of the invention. The tool 800 includes a reservoir 802 for housing anti-spatter solution. The tool 800 can also include a bracket 804 for mounting the tool 800 or components thereof with respect to the apparatus. In the illustrated embodiment, tool includes a sprayer housing 806 that defines an orifice 808 through which anti-spatter solution can be sprayed. As depicted, the sprayer housing 806 is mounted on the same bracket as the reservoir 802, but this is not required. The sprayer housing 806 can define one or more couplings for attaching one or more pneumatic hoses (not shown). The pneumatic hoses can also couple to the reservoir 802. In a particular embodiment, the hoses supply anti-spatter solution from the reservoir 802 to the sprayer housing 806 for passage through the orifice.

In a particular embodiment, the tool 800 can be actuated to a position near the second end of the nozzle distal from the torch, i.e., the end closest to the workpiece during torch operation. The tool 800 can be actuated by a driver, e.g., as described above, that can couple to the bracket or to the sprayer housing 806. In another embodiment, the tool 800 can be fixedly located, and the torch can be moved into communication with the tool 800. In an exemplary embodiment, the nozzle of the torch can be positioned approximately one inch from the orifice 808 and aligned therewith. The contact tip can be disposed within the nozzle and, thus, aligned generally orifice 808. In such an embodiment, pneumatic pressure from a valve coupled to the reservoir 802 can force solution through the pneumatic hoses and towards the sprayer housing 806. In one embodiment, anti-spatter solution can be expelled from the orifice 808 and into fluid contact with the second end of nozzle, the retaining head assembly, and the contact tip and to coat portions thereof. The solution can enter the nozzle through the opening at the second end of the nozzle and can coat the components disposed therein in addition to coating the interior surface of the nozzle.

The anti-spatter solution generally helps to prevent spattered welding wire and debris from accumulating on torch parts. Several examples of anti-spatter solution are known in the art such as TOUGH GARD (a registered trademark of Tregaskiss, Ltd. of Windsor, Canada). The tool 800 preferably employs a water-based anti-spatter solution having relatively low viscosity. After the solution has been applied to the torch, the nozzle and the tool 800 can be disengaged, e.g., by actuating the tool 800 away from the nozzle or by actuating the nozzle away from the tool (or some combination thereof). In one embodiment, the welding wire can be severed after application of the anti-spatter solution, e.g., as described above with respect to FIG. 7. In another embodiment, the welding wire is severed before application of the anti-spatter solution.

While the invention has been particularly shown and described with reference to specific illustrative embodiments, it should be understood by those of skill in the art that various changes in form and detail may be made without departing from the spirit and scope of the invention as expressed in the appended claims.

What is claimed is:

1. An apparatus for automated servicing of a welding torch nozzle including a first end of the nozzle that is adjacent to the torch when the nozzle is secured to the torch, the apparatus comprising:
   a moveable base;
   a nozzle removal tool mounted on the base and positionable by movement of the base for removing or replacing the nozzle when the base is in a first position; and
   a cleaning tool disposed in a spaced relation from the base that enters the first end of the nozzle and cleans an interior of the nozzle, when the base is in a second position after the nozzle is removed from the torch and the nozzle is moved by the base to the second position, wherein actuation of the moveable base interchanges locations of the first and second positions.

2. The apparatus of claim 1 further comprising:
   a third tool mounted on the base for at least one of removing or replacing the nozzle, wherein actuation of the base interchanges the location of the first tool and the third tool.

3. The apparatus of claim 2, wherein the nozzle is replaced with a second nozzle.

4. The apparatus of claim 1 further comprising:
   a clamping tool for securing the welding torch in a fixed location with respect to the apparatus while the nozzle is being serviced.

5. The apparatus of claim 1 further comprising:
   a tool for applying anti-spatter solution to a second end of the nozzle.

6. The apparatus of claim 1, wherein the apparatus is adapted for automated relocation adjacent a second torch for servicing the second torch.

7. An apparatus for automated servicing of a welding torch that includes a contact tip secured to a retaining head assembly disposed within a removable nozzle, wherein the nozzle has a first end adjacent to the torch when the nozzle is secured to the torch and a second end remote from the torch, the apparatus comprising:
   a movable base;
   a first nozzle removal tool mounted on the base and positionable by movement of the base for removing or replacing the nozzle when the base is in the first position;
   a first cleaning tool that enters the first end of the nozzle and cleans an interior of the nozzle when the base is in a second position and the nozzle is moved by the base to the second position;
   a second nozzle removal tool mounted on the base and positionable by the movement of the base for removing or replacing the nozzle when the base is in the first or the second position, wherein actuation of the base interchanges the location of the first nozzle removal tool and the second nozzle removal tool;
   a second cleaning tool that rotatably contacts and cleans the retaining head assembly as the second cleaning tool engages a surface of the retaining head assembly;
   a sub-assembly positioned relative to the base that removes and replaces the contact tip obtained from a magazine that holds one or more replacement contact tips; and
   a clamping tool for securing the welding torch in a fixed location with respect to two or more of the base, the first cleaning tool, the second cleaning tool, or the sub-assembly while the torch is being serviced.

8. The apparatus of claim 7 further comprising: a third cleaning tool for applying an anti-splatter solution to at least one of the second end of the nozzle, the retaining head assembly, or the replacement contact tip.

9. The apparatus of claim 7 further comprising: a fourth cleaning tool for severing a welding wire near at least one of the second end of the nozzle or an aperture of the contact tip.

* * * * *